United States Patent [19]

Robertson et al.

[11] Patent Number: 5,703,990

[45] Date of Patent: Dec. 30, 1997

[54] APPARATUS FOR HOUSING A LINEARIZED OPTICAL FIBER AMPLIFIER

[75] Inventors: Derek Guy Robertson, Nashville; Marcus W. Shute, Lithonia, both of Ga.

[73] Assignee: Lucent Technologies Inc., Murray Hill, N.J.

[21] Appl. No.: 616,045

[22] Filed: Mar. 14, 1996

[51] Int. Cl.⁶ .................................................. G02B 6/00
[52] U.S. Cl. ............................ 385/135; 385/134; 359/341
[58] Field of Search ................................ 385/135, 134, 385/136, 137, 138, 139, 88, 89, 92; 359/341

[56] References Cited

U.S. PATENT DOCUMENTS 5,515,200  5/1996  Delrosso et al. .................. 385/135 X
5,544,273  8/1996  Harrison ............................. 385/135

*Primary Examiner*—Phan T. H. Palmer

[57] ABSTRACT

The invention is directed to an apparatus for housing a linearized optical fiber amplifier (LOFA) circuit. The apparatus includes a body member, preferably made of foam plastic material, that defines cavities to receive the components of the LOFA circuit including a dispersion compensation fiber (DCF) reel. The apparatus includes opposing arcuate members about which optical fibers coupling components of the LOFA circuit are looped. Retaining rings fitted over the first and second arcuate members and supported by at least one surface defined in the body member, can be used to separate each optical fiber from others to provide organization and to prevent entanglement of the optical fibers. A reel receptacle member receives and holds an active fiber (AF) reel of the LOFA circuit. The reel receptacle member can be placed between the arcuate members to be held therebetween. The body member can be fitted into a case, preferably made of a rigid, lightweight material such as aluminum, that protects the LOFA circuit from damage due to shock or impact.

15 Claims, 12 Drawing Sheets

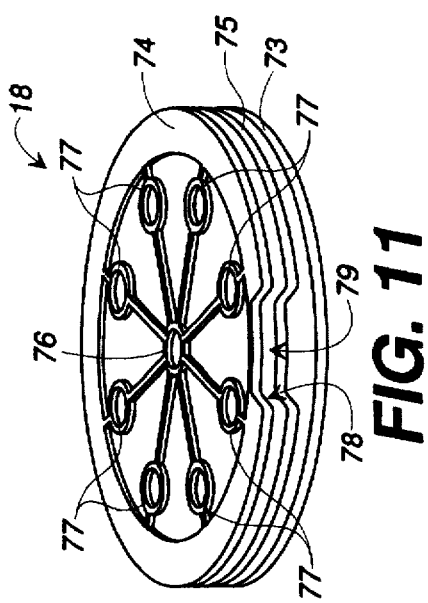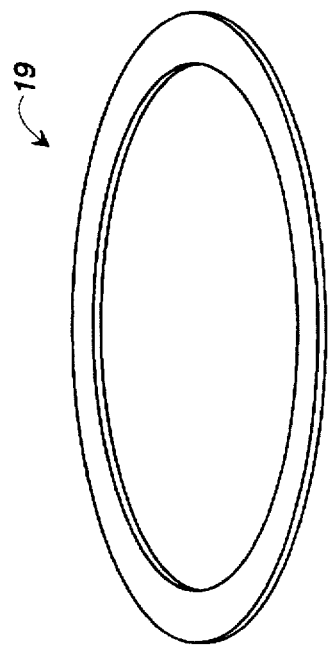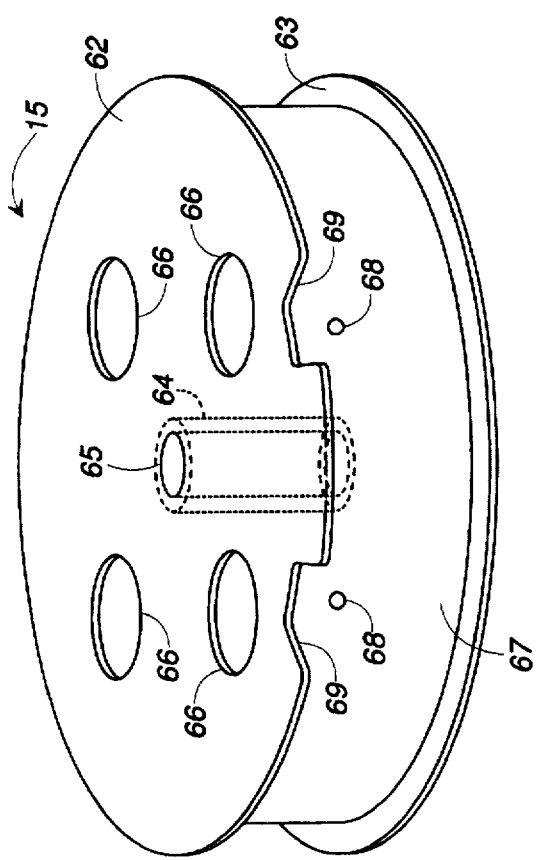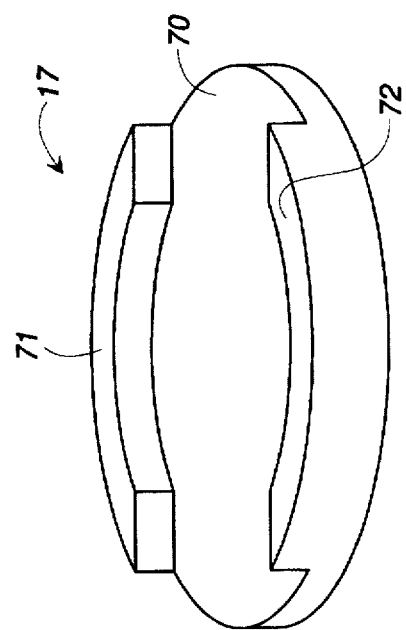

APPARATUS FOR HOUSING A LINEARIZED OPTICAL FIBER AMPLIFIER

BACKGROUND OF THE INVENTION

1. Field of the Invention

This invention is directed to an apparatus for housing a linearized optical fiber amplifier (LOFA) used to amplify and perform dispersion compensation on an optical signal.

2. Description of the Related Art

The transmission of an optical signal with high-frequency components on an optical fiber, particularly over a long distance, requires compensation of the signal for optical dispersion so that the signal can be accurately detected at its destination. To amplify and compensate for dispersion of an optical signal, linearized optical fiber amplifiers (LOFAs) are used in the telecommunications industry. The LOFA includes an optical circuit with a dispersion compensation fiber (DCF). The DCF is typically an optical fiber that can be from a fraction of a kilometer to several kilometers in length and is thus of considerable length, requiring a relatively large reel, usually several inches in diameter, for its storage.

It has been standard practice in the telecommunications industry to package a LOFA circuit with its DCF reel separated from the remainder of the packaged LOFA circuit. This standard LOFA package assembly configuration has several disadvantages. Specifically, the optical fibers running between the DCF reel and the package are exposed to significant risk of damage and, also, the LOFA circuit package and the DCF reel, separated as they are, must be supported with two hands when a technician is carrying or handling the assembly. Further, separate storage spaces, containers and fasteners must be used in a storage rack or the like to hold the LOFA package and the DCF reel in position.

Another problem that is commonly encountered with conventional LOFA packaging assemblies is that the LOFA circuit components and the optical fibers coupling the components are stored in the packaging assemblies so that one component cannot be accessed for repair or maintenance, for example, without the necessity of moving other LOFA circuit components and the optical fibers loosely contained in the package. Because in these conventional LOFA packaging assemblies movement of the LOFA circuit components presents the risk of damaging optical fiber connections, as well as the fibers themselves, it would be desirable if the optical fibers could be protected in a way that would reduce the danger of damaging the optical fibers when moving the LOFA circuit components during assembly, repair or maintenance of the LOFA circuit.

SUMMARY OF THE INVENTION

This invention overcomes the disadvantages of conventional LOFA packaging assemblies as described in the foregoing. The invention is an apparatus for housing a LOFA circuit, and includes a body member, preferably made of foam plastic material, that defines cavities to receive the components of the LOFA circuit. Preferably, on a first side, the body member defines a cavity to receive a DCF reel of the LOFA circuit, and the second side defines at least one cavity to receive the remaining components of the LOFA circuit. The apparatus of this invention thus contains and protects the components of the LOFA circuit within the body member in a compact and well-organized, unitary structure.

Preferably, the body member defines at least one opening that communicates with the cavity defined on the first side as well as a cavity defined on the second side of the body member. When the apparatus is assembled, the optical fibers coupling the DCF to other components of the LOFA circuit extend through the opening, and therefore are contained inside the body member and protected from damage.

In a preferred configuration of the apparatus, the body member has first and second arcuate members arranged in opposition on respective sides of a cavity that receives a wavelength division multiplexer (WDM) of the LOFA circuit. Preferably, the optical fibers that couple components of the LOFA circuit, are wound about the first and second arcuate members. The arcuate members have respective radii that are greater than or equal to the minimum allowable bending radius of the optical fiber(s) to prevent signal loss in the optical fiber(s) as a result of being overbent when wound or looped on the arcuate members. The apparatus includes one or more retaining rings that can be fitted over the arcuate members. When so fitted over the arcuate members, the retaining rings are supported by surfaces defined in the body member. The retaining rings serve to confine respective optical fibers in the body member as well as to provide organization for the optical fibers and to prevent the optical fibers from becoming entangled with each other. Preferably, the apparatus includes a reel receptacle member having first and second opposing side members. The receptacle member receives and holds an active fiber (AF) reel of the LOFA circuit between the first and second side members. The receptacle member can be inserted between the arcuate members to be held therebetween. To house other components of the LOFA circuit such as a single-stage WDM or an isolator, the body member can define one or more communicating grooves and cavities. The components of the LOFA can be inserted into the cavities and the optical fibers connected to each component can be placed in respective grooves for protection within the body member.

To protect the LOFA circuit from shock or impact, the apparatus includes a protective case into which is fitted the body member housing the LOFA circuit. The protective case is composed of a substantially rigid and preferably lightweight material such as a hard plastic or a lightweight metal such as aluminum. To the protective case, input and output optical connectors for the LOFA circuit can be mounted. Also, the protective case preferably houses and supports a pump laser that generates laser light for use in amplifying an optical input signal in the LOFA circuit. The pump laser receives electric power for its operation through an electric connector mounted to the case. The electric connector can also be used to output electric signals generated based on signals from one or more taps from components of the LOFA circuit to monitor performance of the LOFA.

These together with other objects and advantages, which will become subsequently apparent, reside in the details of construction and operation as more fully hereinafter described and claimed, reference being had to the accompanying drawings, forming a part hereof, wherein like numerals refer to like parts throughout.

BRIEF DESCRIPTION OF THE DRAWINGS

The present invention can be better understood with reference to the following drawings. The drawings are not necessarily to scale, emphasis instead being placed upon clearly illustrating principles of the present invention.

3

Figure 3:
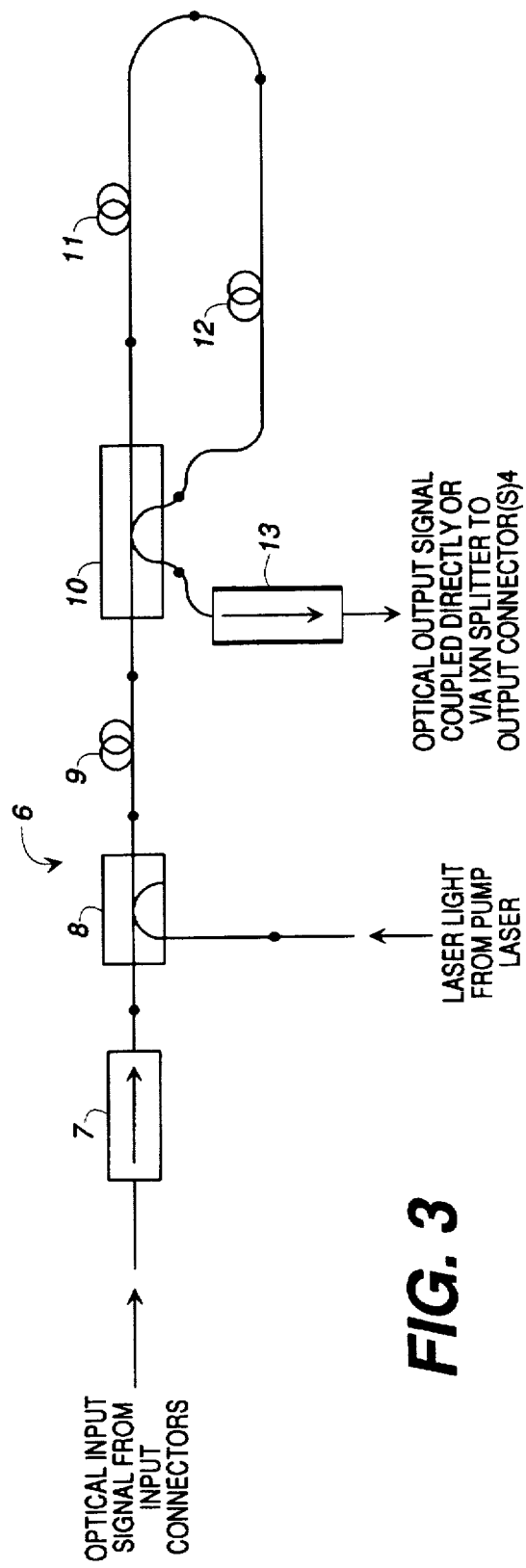
Figure 4:
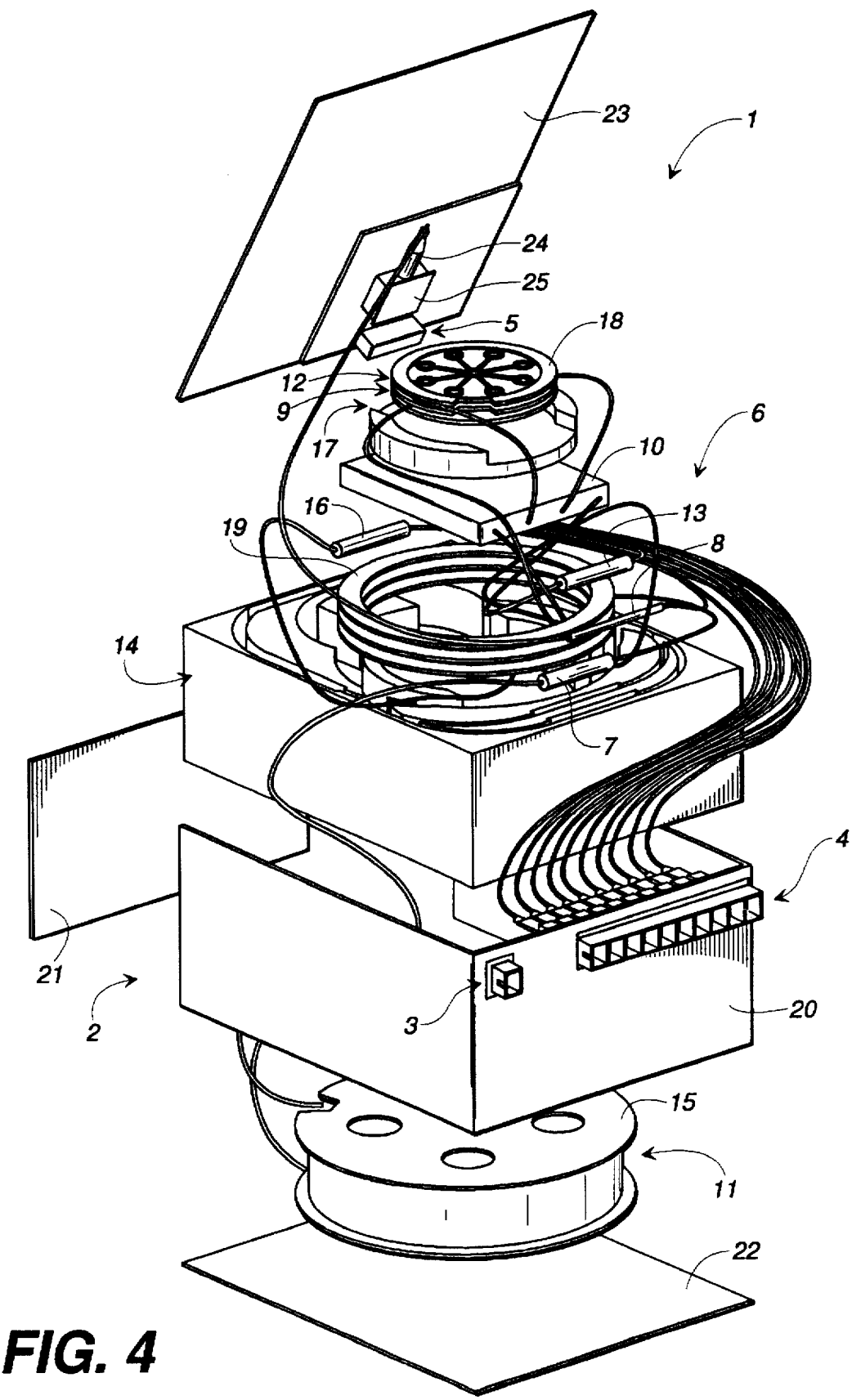
Figure 5:
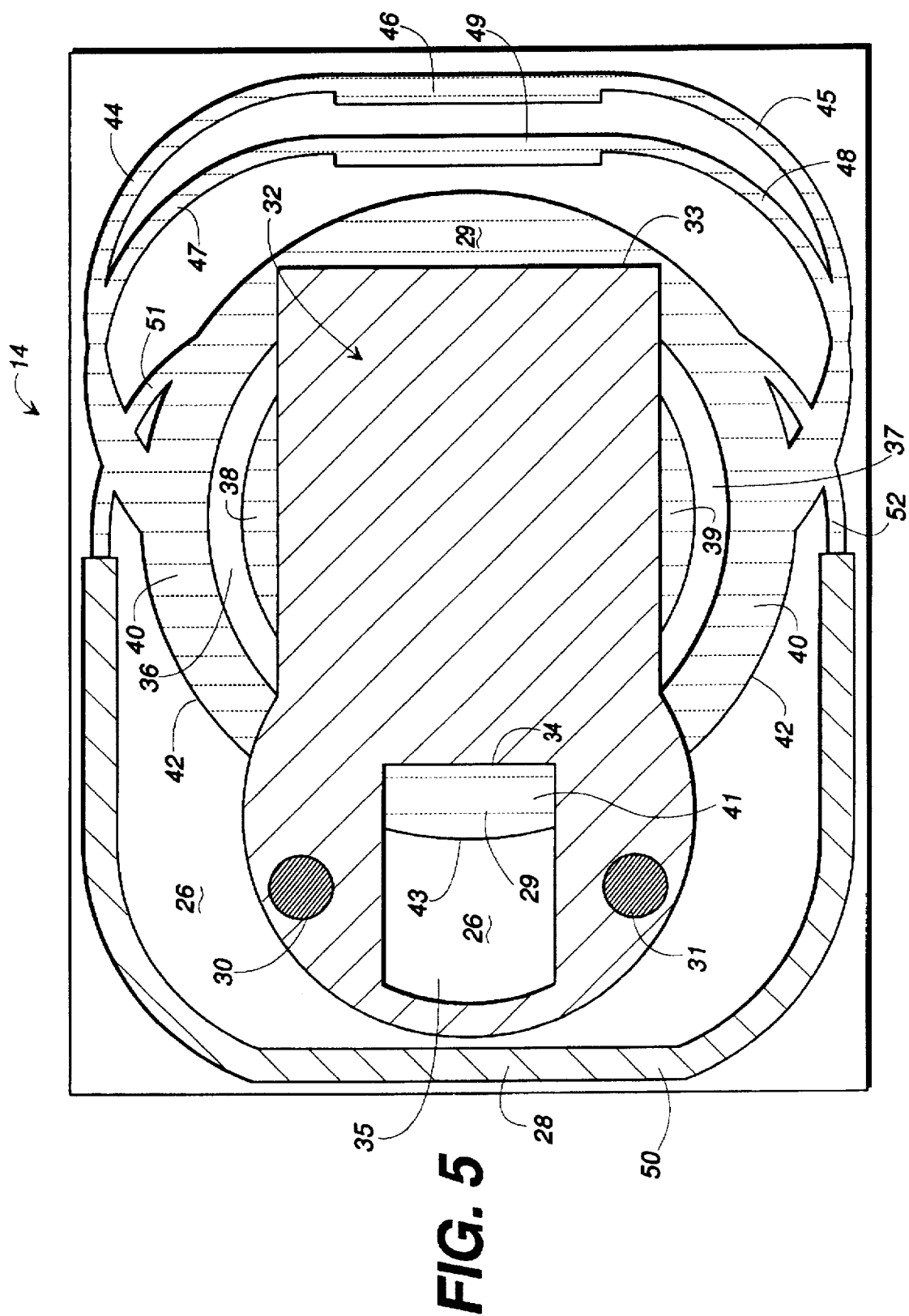
Figure 6:
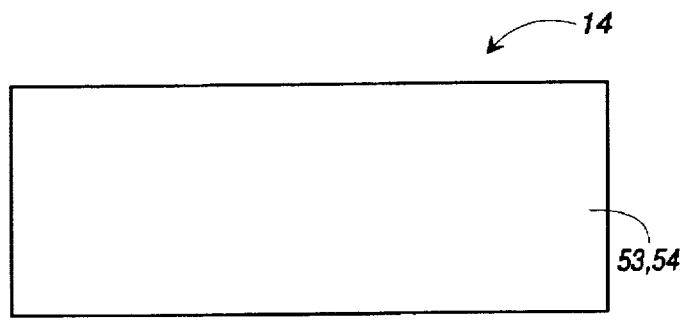
Figure 7:
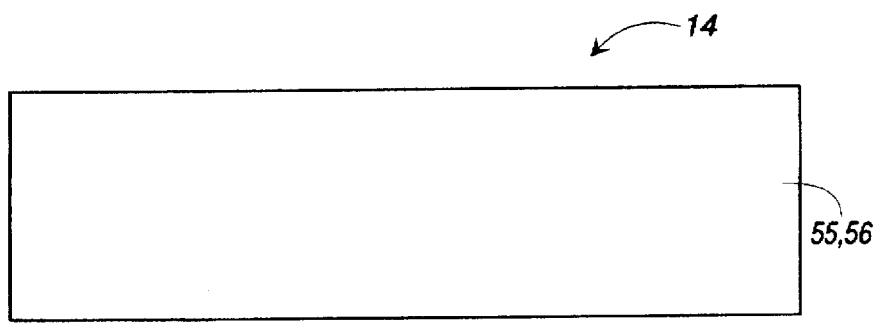
Figure 8:
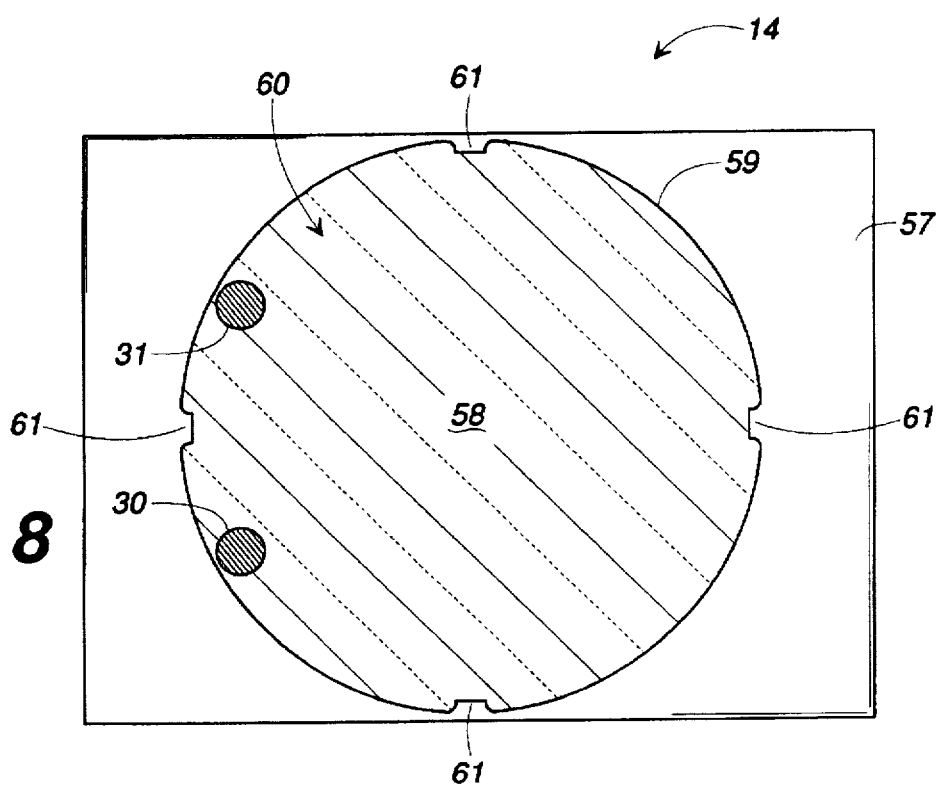
Figure 13A:
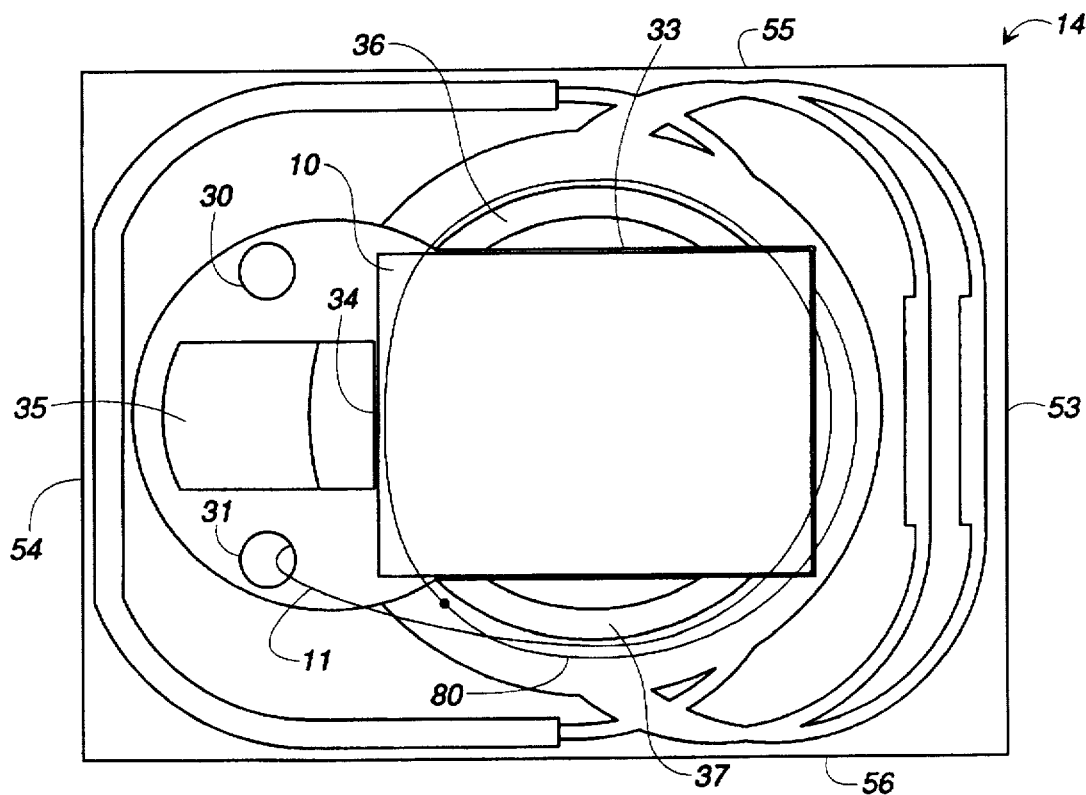
Figure 13B:
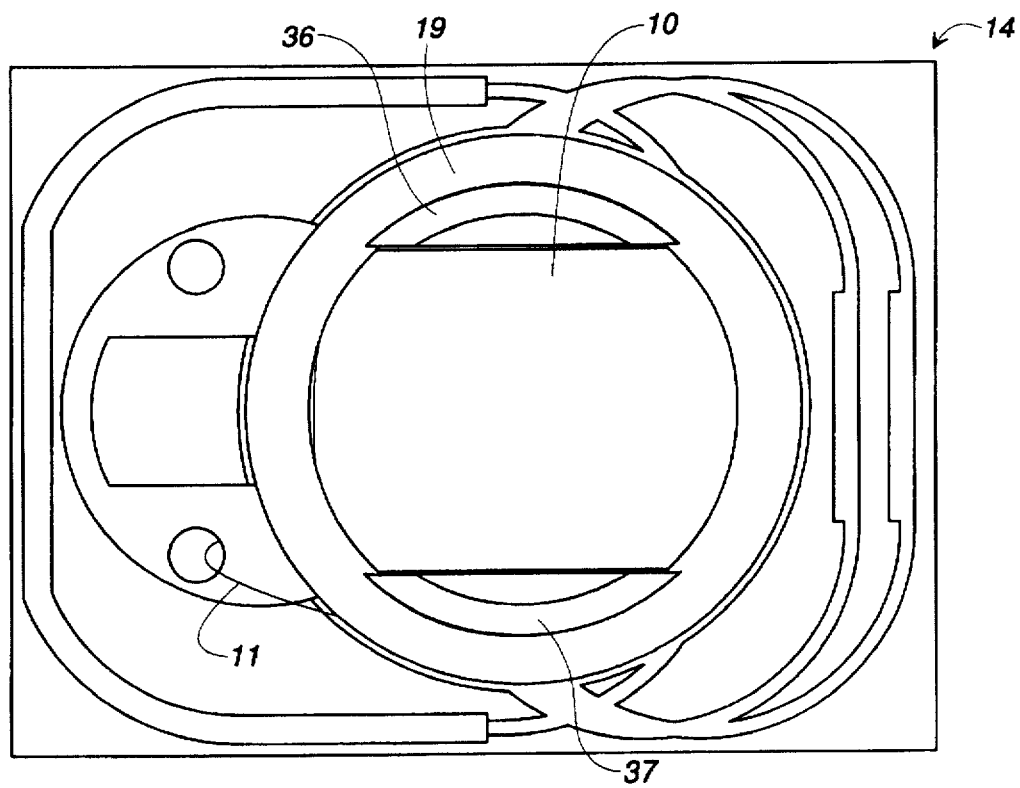
Figure 13C:
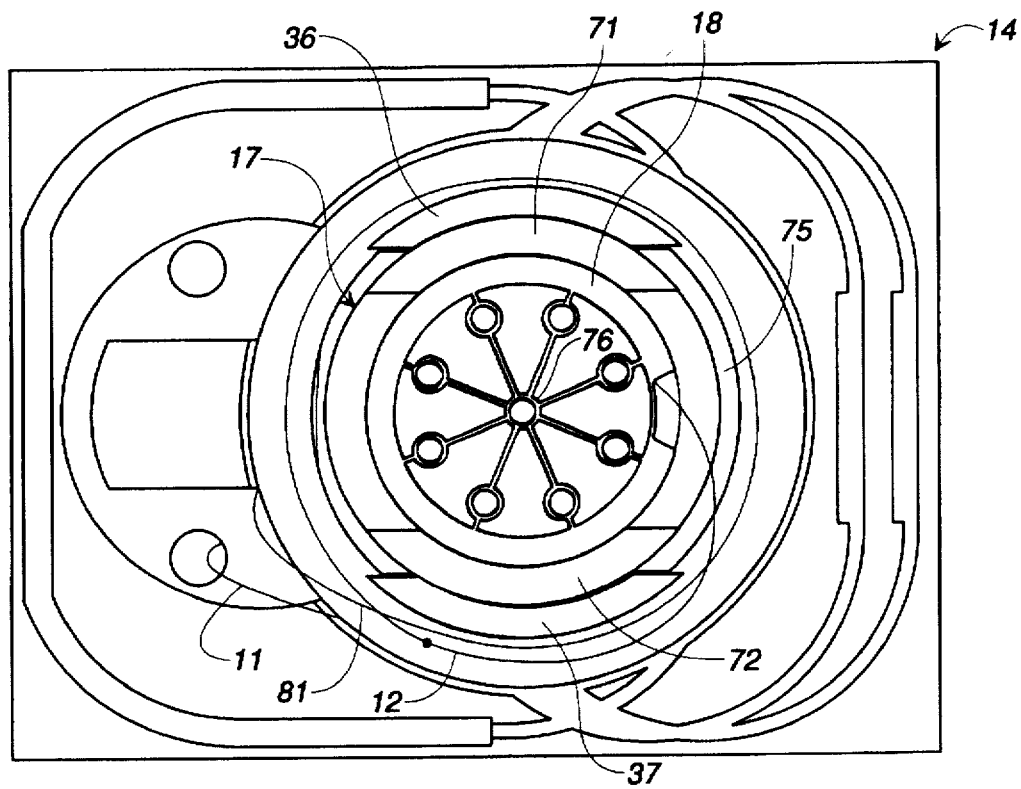
Figure 13D:
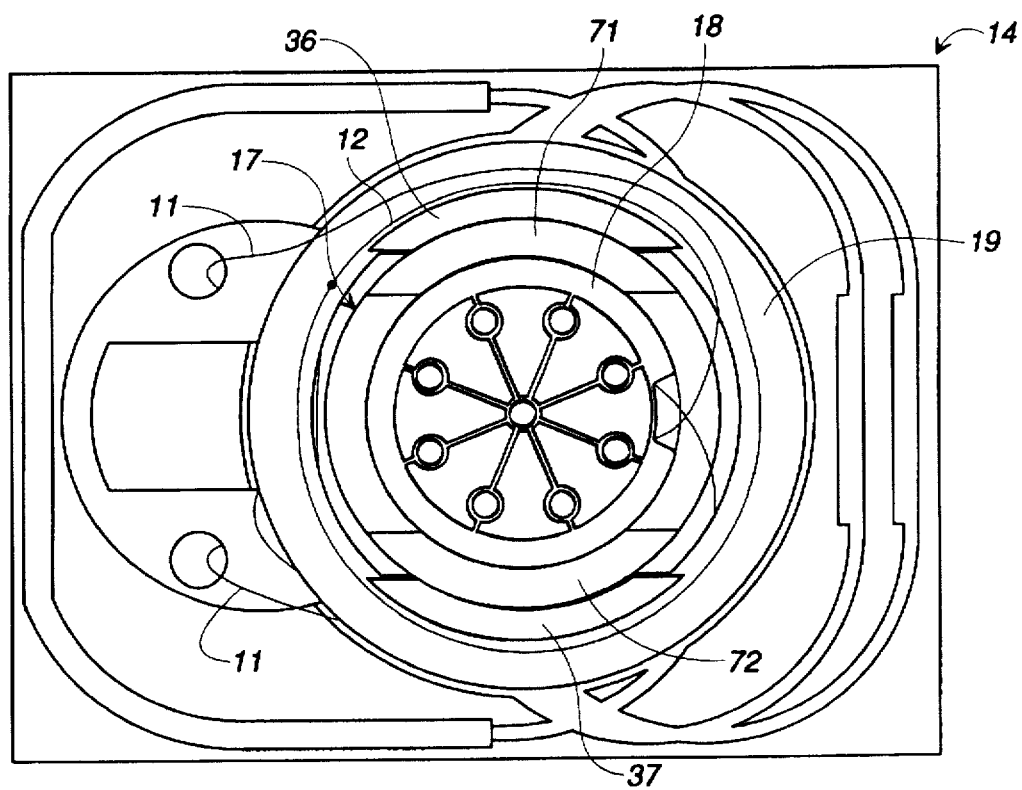
Figure 13E:
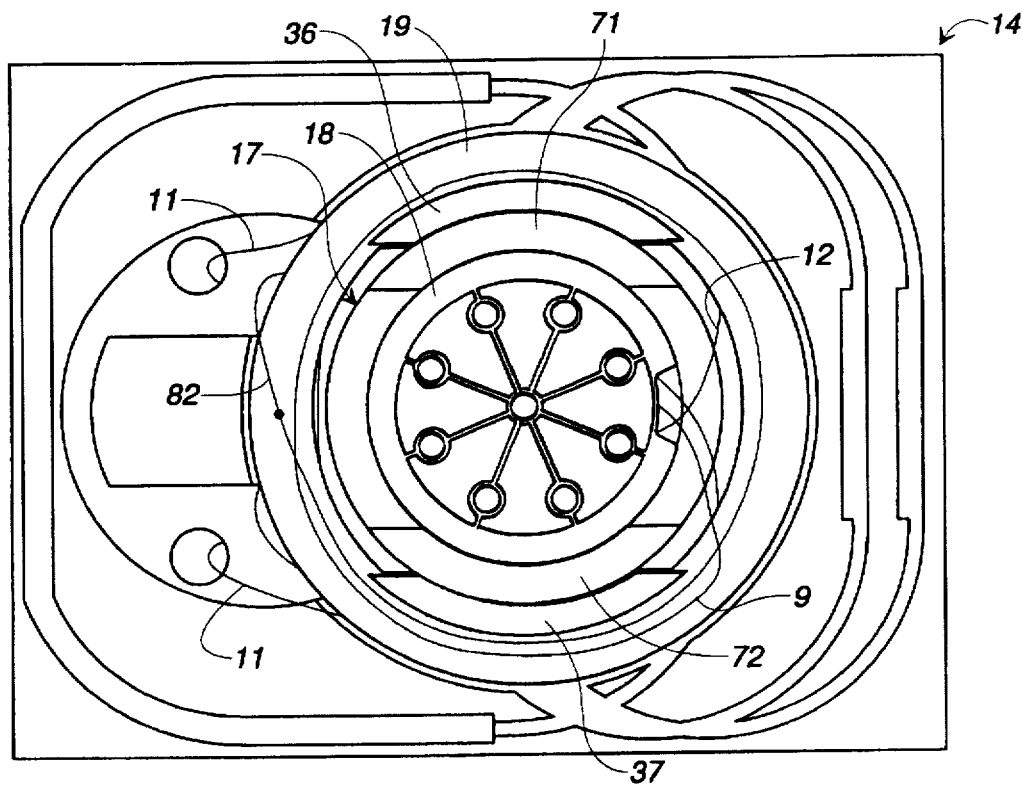
Figure 13F:
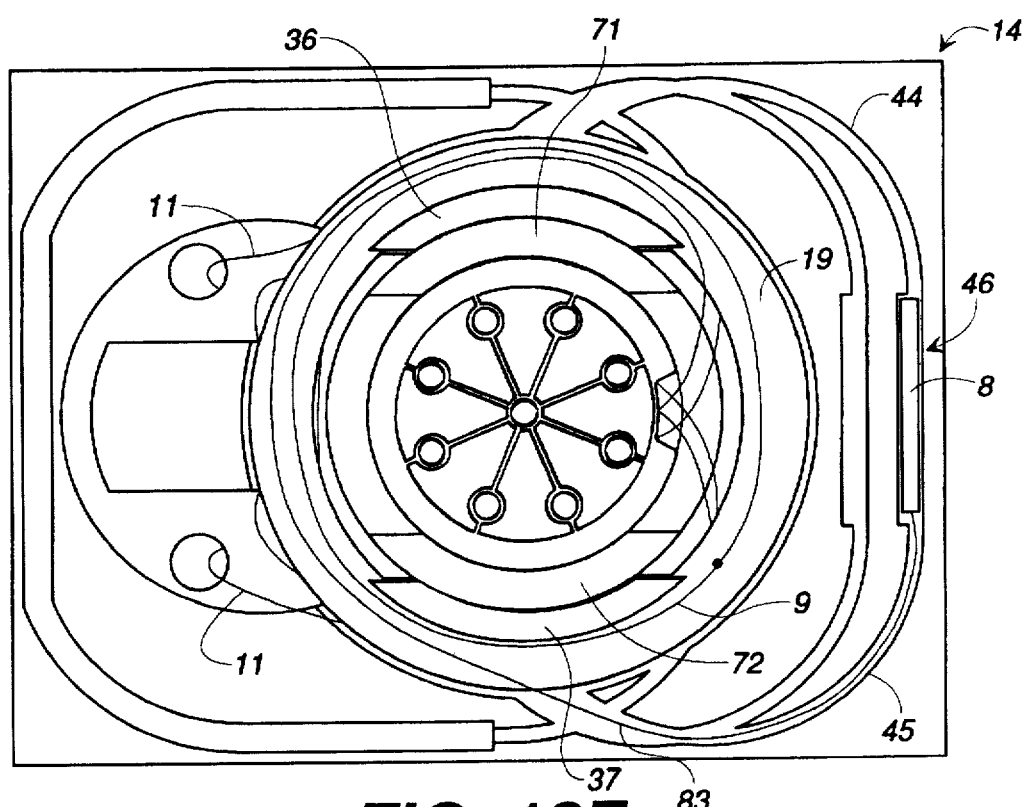
Figure 13G:
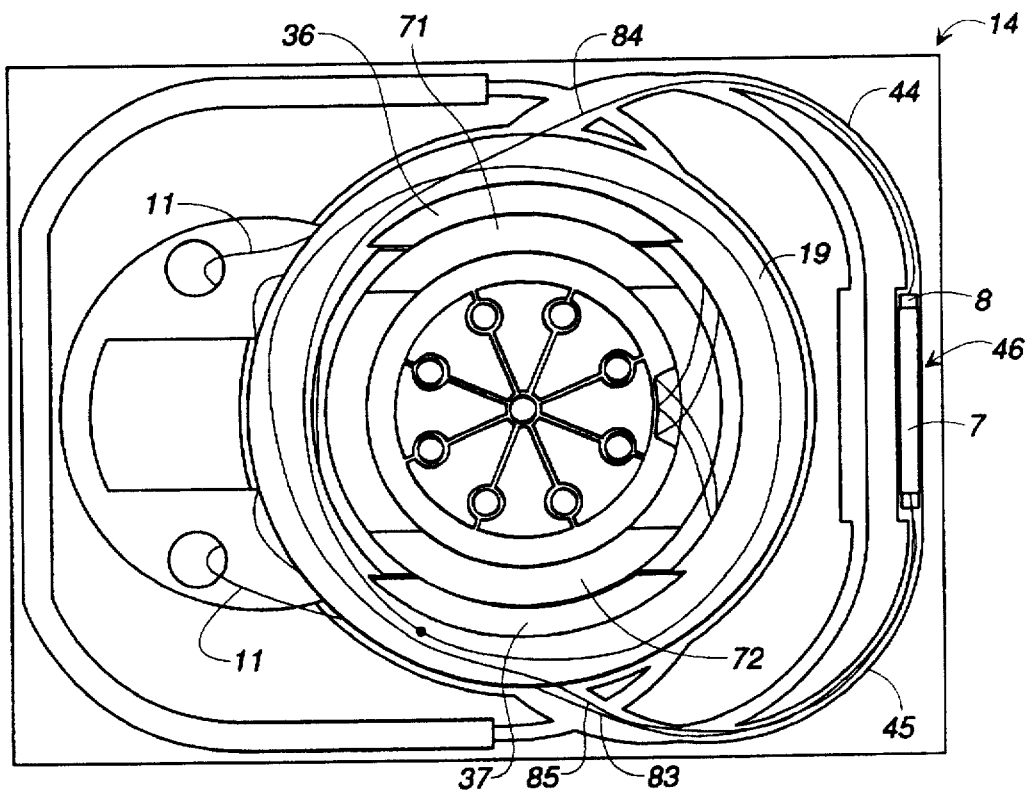
Figure 13H:
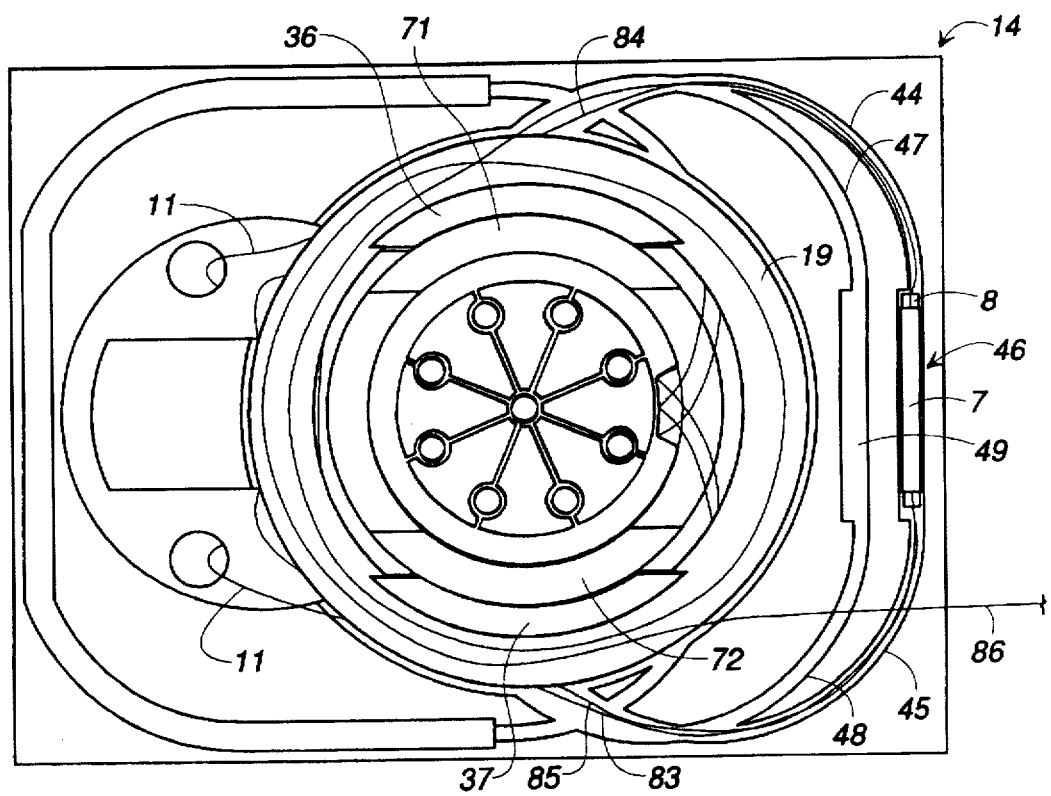
Figure 13I:
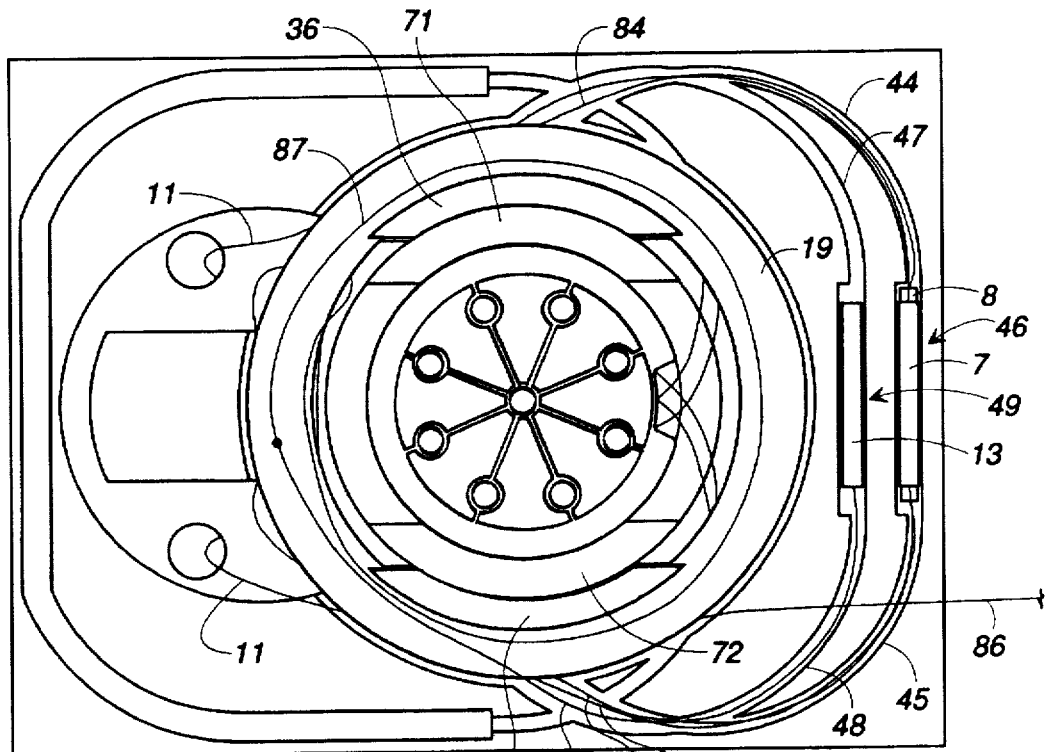
Figure 13J:
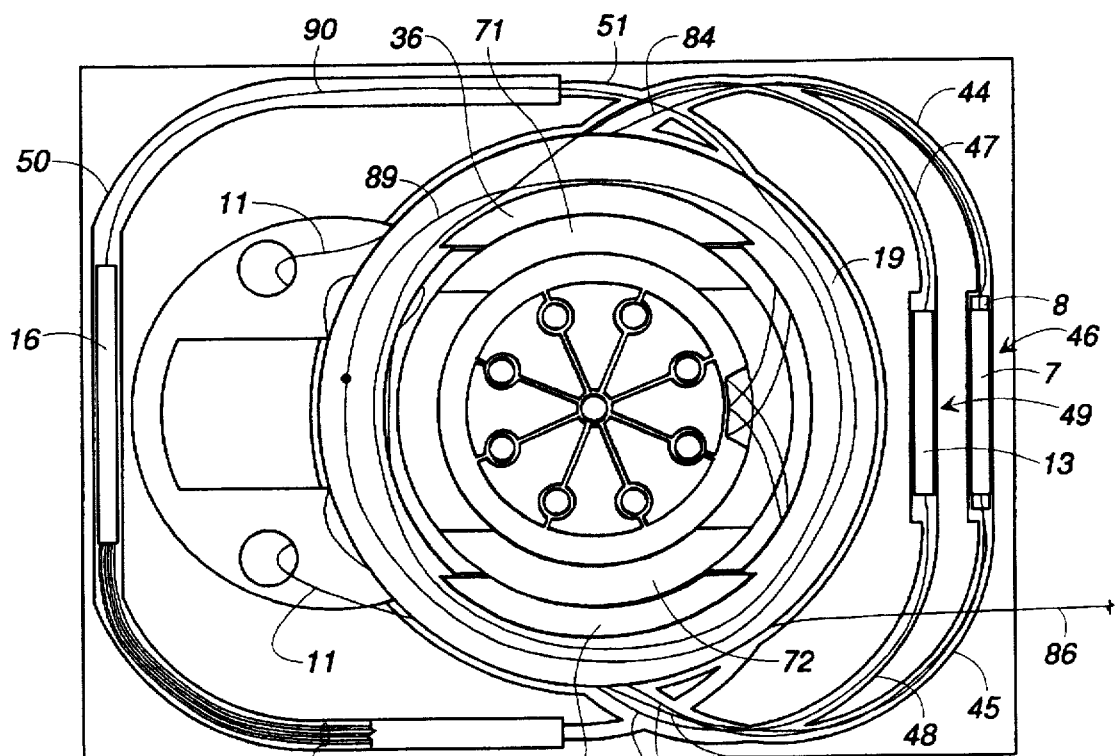
Figure 13K:
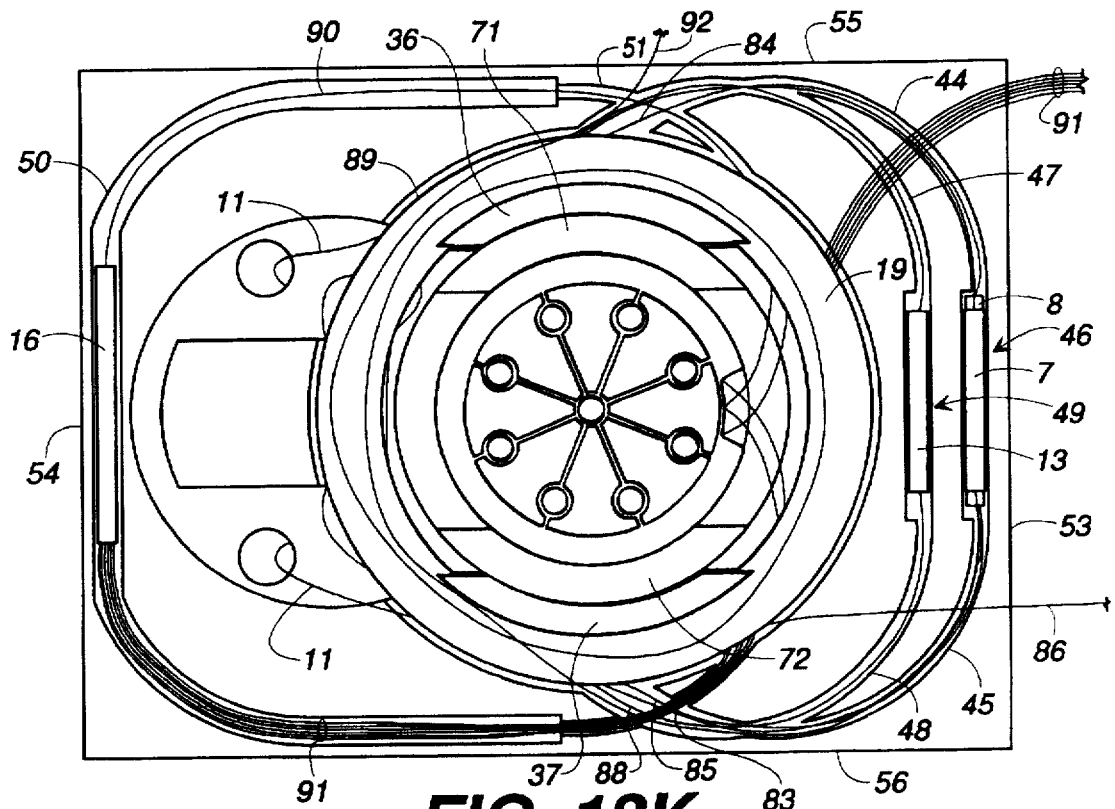
Figure 13L:
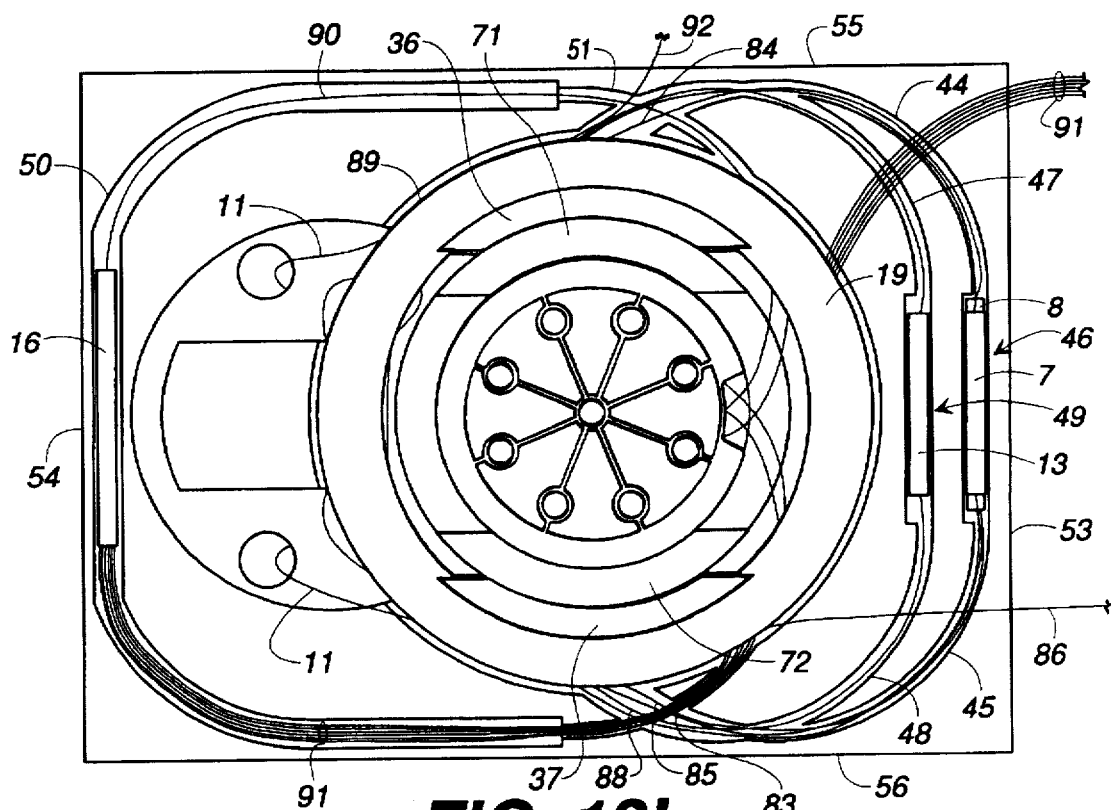
Figure 14:
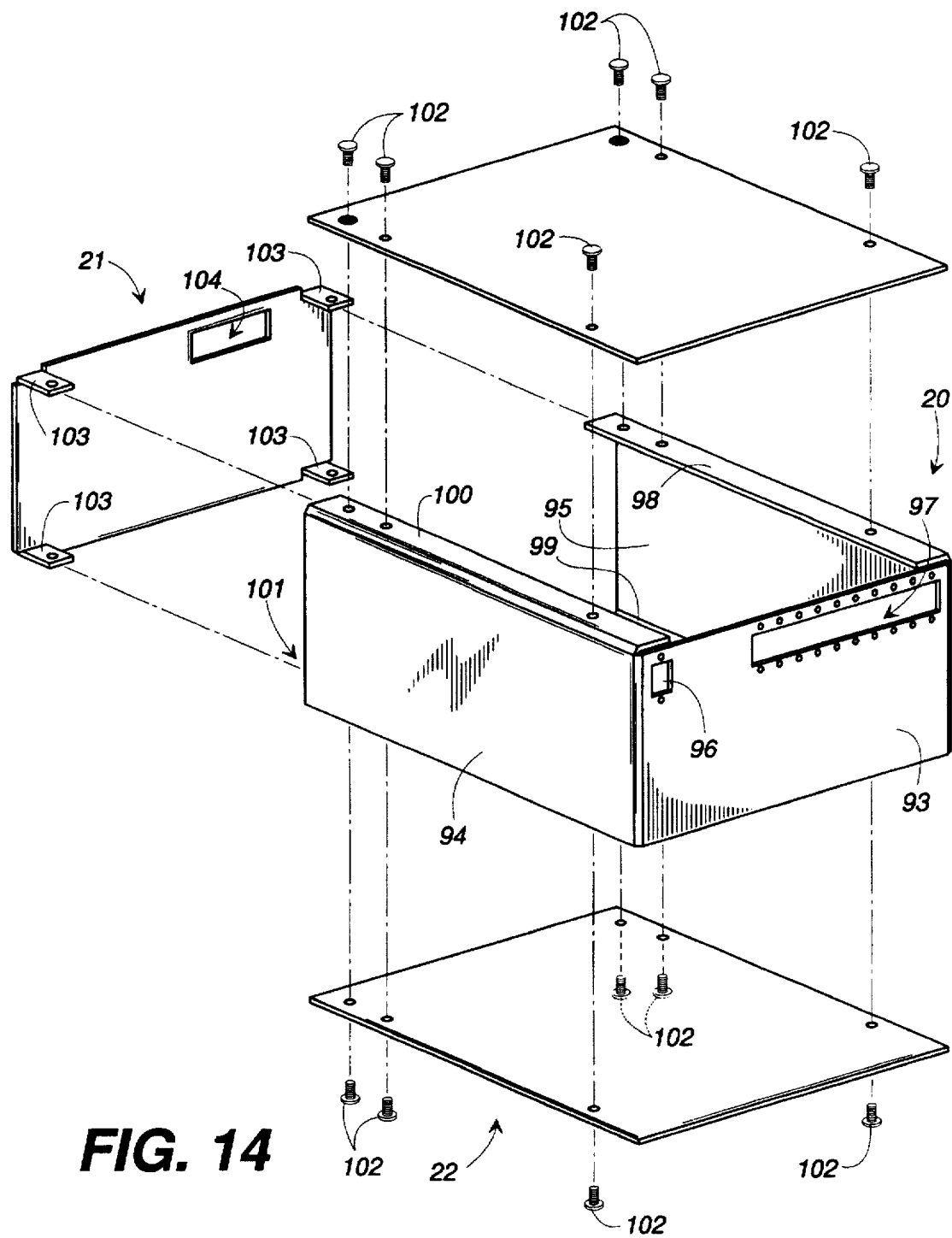

FIG. 3 is a block diagram of a typical LOFA circuit that can be housed in the apparatus;

FIG. 4 is an exploded perspective view of the apparatus;

FIG. 5 is a top plan view of a body member of the apparatus;

FIG. 6 is an end view of the body member;

FIG. 7 is a side view of the body member;

FIG. 8 is a bottom plan view of the body member;

FIG. 9 is a perspective view of a dispersion compensation fiber (DCF) reel;

FIG. 10 is a perspective view of a reel receptacle member;

FIG. 11 is a perspective view of an active fiber (AF) reel;

FIG. 12 is a perspective view of a retaining ring;

FIGS. 13A–13L are top plan views showing a representative sequence of steps for assembling a LOFA circuit in the body member; and FIG. 14 is an exploded perspective view of a protective case of the apparatus of this invention.

DESCRIPTION OF THE PREFERRED EMBODIMENTS

Figure 1:
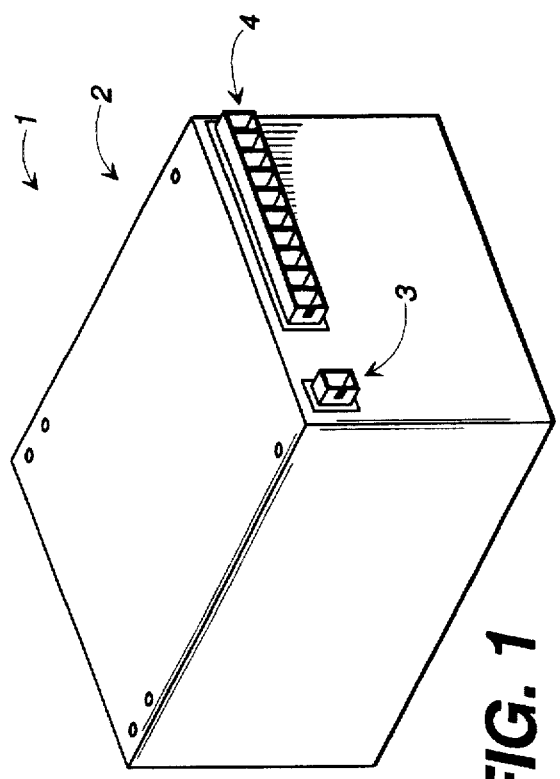
FIG. 1 is a first perspective view of an apparatus in accordance with this invention.

FIG. 1 is a view of an apparatus 1 in a preferred embodiment of this invention, for housing a linearized optical fiber amplifier (LOFA) circuit. The apparatus 1 is shown in its assembled configuration in which the LOFA circuit is contained entirely within a protective case 2. At one end of the case 2 an input connector 3 and at least one output connector 4 are mounted and the apparatus 1 generally includes several output connectors 4 mounted side-by-side to the case 2. The input connector 3 can be coupled to an optical fiber cable (not shown) that supplies an optical input signal to the LOFA circuit housed by the apparatus 1. The output connectors 4 can be connected to respective optical fiber cables (not shown) to carry amplified, dispersion-compensated optical output signal(s) generated by the LOFA circuit based on the optical input signal. The input and output connectors 3,4 can be any type of connector capable of coupling optical fibers such as, for example, SC, FC or ST type connectors.

Figure 2:
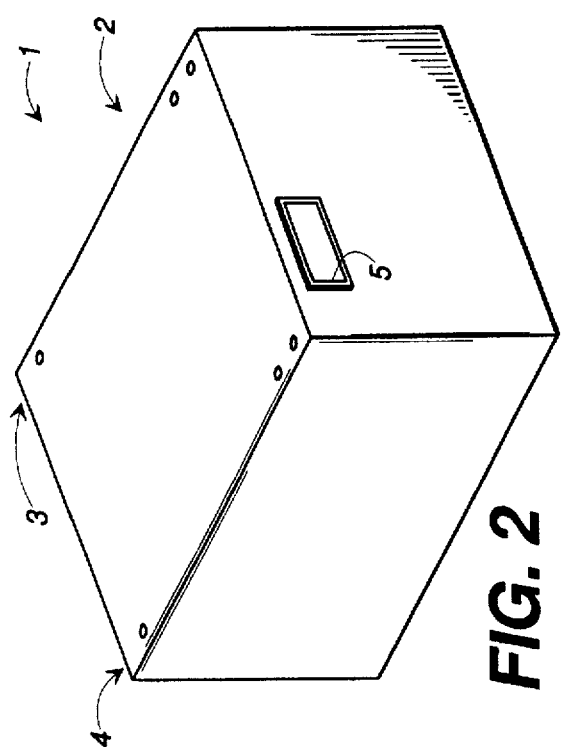
FIG. 2 is a second perspective view of the apparatus.

FIG. 2 is another perspective view of the apparatus 1 in its assembled configuration. In FIG. 2, the apparatus 1 is rotated by 180 degrees about a vertical axis relative to FIG. 1 so that the rear end of the apparatus 1 is visible in FIG. 2. An electrical connector 5 is mounted in the case 2. The electrical connector 5 can be coupled to a plug (not shown) to supply electric power to a pump laser (not shown in FIG. 2) that is housed in the apparatus 1. The connector 5 can also be used to output one or more signals from respective taps at various points of the LOFA circuit, for use in monitoring the performance of the LOFA circuit.

FIG. 3 is a block diagram of an example of a LOFA circuit that can be housed in the apparatus 1 of this invention, and is show for the purpose of illustration, and not limitation, of a typical LOFA circuit that can be housed in the apparatus 1. It should be understood other LOFA circuit configurations can be housed in the apparatus 1 of this invention with no modifications or with modifications that will be apparent to persons that have a basic familiarity with LOFA circuit packaging. In FIG. 3, the LOFA circuit 6 includes an input isolator 7 that is coupled to receive an optical input signal from the input connector 3 of FIG. 1. The input isolator 7 allows an optical signal to pass through it in only one direction. Thus, light can pass from the input connector 3 through the isolator 7 to the remaining components of the LOFA circuit, but cannot pass though the isolator 7 in the reverse direction from the LOFA circuit to the input connector 3.

4

The LOFA circuit 6 also includes a wavelength division multiplexer (WDM) 8. In FIG. 3, the WDM 8 has a first input coupled to receive the optical input signal from the input isolator 7, and a second input coupled to receive laser light from a pump laser. The WDM 8 and/or the wavelength of light generated by the pump laser are selected so that the WDM 8 combines and transmits the pump laser light together with the optical input signal. The output of the WDM 8 is spliced directly to an active fiber 9 that is doped with rare earth ions. The pump laser light input to the active fiber 9 from the WDM 8 creates a population inversion of energy states of electrons in the active fiber 9 so that lasing occurs in the active fiber 9. The lasing occurs in such a manner that the output signal from the active fiber 9 is an amplified version of the optical input signal.

The output end of the active fiber 9 is coupled to an input terminal of a second wavelength division multiplexer (WDM) 10. A terminal of the second WDM 10 is coupled with a splice directly to one end of a dispersion compensation fiber (DCF) 11. Because the DCF 11 is significantly long, typically on the order of a fraction of a kilometer to several kilometers in length, the optical signal traveling through the DCF 11 is subjected to appreciable attenuation. Accordingly, the second end of the DCF 11 is coupled directly or spliced with an optical fiber, to an active fiber 12 that uses a portion of the pump laser light that passes through the WDM 10 to amplify the optical signal further. The second end of the active fiber 12 is coupled to a terminal of the WDM 10. The output terminal of the WDM 10 is coupled to supply the optical output signal to an input terminal of an output isolator 13.

The output isolator 13 allows the optical output signal to pass from the WDM 10 to the output connector(s) 4 in a forward direction, but prevents an optical signal from passing in the reverse direction from the connector(s) 4 to the WDM 10. The LOFA circuit 6 can, and in the usual LOFA circuit application does, include a 1×N splitter (not shown in FIG. 3) that has an input coupled to the output of the isolator 13, and N outputs coupled to respective output connector(s) 4, (see FIG. 2). Accordingly, if the 1×N splitter is used in the LOFA circuit 6, N optical output signals that are amplified, dispersion-compensated versions of the optical input signal, are output from the apparatus 1.

FIG. 4 is an exploded perspective view of an apparatus 1 for housing a LOFA circuit 6 in accordance with the principles of the invention. The apparatus 1 includes a body member 14 that contains the components of the LOFA circuit 6. Preferably, the body member 14 is composed of a foam plastic material such as polyethylene which is relatively lightweight, low-cost and resilient, that cushions the components of the LOFA circuit 6. In its top and bottom surfaces in FIG. 4, the body member 14 defines cavities preferably sufficient in number and size to receive all of the components of the LOFA circuit 6. In the exemplary embodiment of FIG. 4, the body member 14 defines on its bottom surface a first cavity (not shown in FIG. 4) that receives a DCF reel 15 upon which the DCF 11 is wound. In the top surface, the body member 14 defines cavities and grooves to receive the input isolator 7, the WDM 8, the WDM 10, the output isolator 13 and a 1×N splitter 16 and fiber splices. As previously explained, 1×N splitter 16, has an input coupled to receive the optical output signal from the output isolator 13, and splits this signal into N optical output signals. The N outputs of the 1×N splitter 16 are coupled to supply the N optical output signals to respective output connectors 4.

The apparatus 1 also includes an active fiber (AF) reel receptacle member 17 that can be fitted into the body member 14. Preferably, the reel receptacle member 17 is made of a foam plastic material such as polyethylene. The AF reel receptacle member 17 is adapted to receive an AF reel 18 of the apparatus 1. The AF reel 18 can be formed of plastic material and is preferably partitioned so that both of the active fibers 9, 12 can be wound on the reel 18.

In order for the optical fibers connecting the components of the LOFA circuit in the body member 14 to be organized and confined so that they are relatively protected, the apparatus 1 preferably includes several optical fiber retaining rings 19. In preferred use, each retaining ring 19 serves to confine a single optical fiber within the body member 14. Thus, although only three retaining rings 19 are shown in FIG. 4 to avoid unnecessary complication, there are preferably many more rings 19 than shown in FIG. 4 that are used to hold the optical fibers of the LOFA circuit in the body member 14. The retaining rings 19 can be stacked in the body member 14 and are preferably made of a plastic material such as Mylar®.

The body member 14, the DCF reel 15, the reel receptacle member 17, the AF reel 18 and the retaining rings 19, when assembled together and with the components of the LOFA circuit 6, are fitted inside of the protective case 2. As shown in FIG. 4, the case 2 preferably includes a three-sided member 20 that defines an end and opposing sides of the case 2. In the end of the three-sided member 20, the input connector 3 and the output connectors 4 are mounted. The case 2 also includes an end plate 21 that is joined to the three-sided member 20 to enclose the two sides and two ends of the body member 14. To enclose the bottom of the body member 14, a bottom plate 22 is joined to the bottom edges of the three-sided member 20 and, to enclose the top side of the body member 14, a top plate 23 can be joined to the top edges of the three-sided member 20. Preferably, a circuit board 24 is mounted to the underside of the top plate 23. To the circuit board 24, a pump laser 25 is mounted. The top plate 23 acts as a heat sink for the pump laser 25. The pump laser 25 is coupled by electrical connections on the circuit board 24 to the connector 5 and can thus be powered when a plug coupled to a power supply is joined with the connector 5. When the top plate 23 is joined to the top edges of the three-sided member 20, the connector 5 fits into an aperture defined in the end plate 21. The LOFA circuit 6, the circuit board 24 and the pump laser 25 are thus contained and protected within the case 2.

In FIG. 5, a top plan view of a preferred configuration of the body member 14 is shown. The unlined regions represent the top surface 26 of the body member 14. The body member 14 defines three different levels 27, 28, 29 indicated by broken lines, and two different sets of diagonal lines oriented in opposite directions, respectively. Preferably, the levels 27, 28, 29 extend to depths of 0.95, 0.75 and 0.5 inches, respectively, into the body member 14 from the top side surface 26. The top side of the body member 14 also defines apertures 30, 31 through which can be fed respective ends of the DCF 11 wound on the DCF reel 15 that is housed in a cavity defined in the bottom side of the body member 14.

The top side of the body member 14 defines a first cavity 32. The first cavity 32 is generally centrally positioned in the top side of the body member 14, and extends to a depth in the body member 14 defined by the level 27. The cavity 32 is generally bounded, at least at its deepest portion, by perpendicular sides 33 extending vertically between levels 27, 29, and by a side 34 of a member 35 that extends vertically from the level 27 to the top side surface 26. The cavity 32 is sized and configured to receive the WDM 10 of the LOFA circuit 6.

On opposing sides of the cavity 32, the first and second opposing arcuate members 36, 37 are defined in the body member 14. Adjacent respective arcuate members 36, 37, ledges 38, 39 are defined in the body member 14. The ledges 38, 39 are defined at level 29, and support the AF reel receptacle member 17 when the member 17 is inserted into the body member 14 between the first and second arcuate members 36, 37. About the outer surfaces of the arcuate members 36, 37, optical fibers coupling the LOFA circuit components can be looped or wound. The respective radii of the arcuate members 36, 37 are greater than the minimum bending radius of the optical fibers to prevent overbending of the optical fibers when looped or wound thereon.

The body member 14 defines a surface 40, and also a surface 41 on the member 35. The surfaces 40, 41 are both defined at level 29. The surfaces 40, 41 together support the retaining rings 19 when fitted over the arcuate members 36, 37. The body member 14 also defines a curved wall 42 extending between the surface 40 and the top side surface 26, that opposes the outer surfaces of the arcuate members 36, 37 and the reel receptacle member 17 when it is inserted into the body member 14 between the arcuate members 36, 37. The member 35 also has a curved wall 43 extending between the surface 41 and the surface 26. Therefore, when the member 17 is inserted into the body member 14 between the arcuate members 36, 37, the outer surface of the member 17 and the outer surfaces of the arcuate members 36, 37, and the walls 42, 43, laterally confine the optical fibers looped about the arcuate members 36, 37. In other words, when the apparatus 1 is assembled, the outer surfaces of the member 17 and the arcuate members 36, 37, the surfaces 40, 41 and the walls 42, 43 together define a discontinuous annular channel in which the optical fibers and splices of the LOFA circuit are looped and confined in the body member 14.

The body member 14 defines grooves 44, 45 with respective ends that communicate with the annular channel at potions defined by the outer surfaces of the arcuate members 36, 37, the surface 40 and the wall 42. The grooves 44, 45 are defined in the body member 14 such that they extend through and form respective breaks in the wall 42. The other ends of the grooves 44, 45 communicate with opposite ends of a cavity 46 defined in the body member 14. The cavity 46 receives the input isolator 7 and the WDM 8 when the apparatus 1 is assembled, and the optical fibers coupled to the input isolator 7 and the WDM 8 are placed in respective grooves 44, 45. The grooves 44, 45 are curved with a radius greater than the minimum bending radius of the optical fibers, and guide the optical fibers into position to be wound about the arcuate members 36, 37. The grooves 44, 45 and the cavity 46 are defined in the body member 14 at level 29 and accordingly are flush with the surface 40.

The body member 14 also defines grooves 47, 48. The grooves 47, 48 have end potions that are common to the grooves 44, 45 and communicate with respective potions of the annular channel defined by the outer surfaces of the arcuate members 36, 37, the surface 40 and the wall 42. The grooves 47, 48 extend through the wall 42 and form respective discontinuities therein. The other ends of respective grooves 47, 48 communicate with opposite ends of the cavity 49 defined in the body member 14. The cavity 49 receives the output isolator 13 of the LOFA circuit 6. The optical fibers coupled to respective ends of the output isolator 13 are placed into respective grooves 47, 48 for their protection and organization. The grooves 47, 48 are curved with radii that are greater than the minimum bending radius of the optical fibers. The grooves 47, 48 are also oriented to guide and bend the optical fibers into a position in which they can be readily wound about the arcuate members 36, 37. Preferably, the grooves 47, 48 and the cavity 49 are formed in the body member 14 at level 29 and thus are flush with the surface 40.

At the end of the body member 14 opposite the end on which the cavities 46, 49 are defined, the body member 14 defines a cavity 50 for receiving the 1×N splitter 16 used to split the optical output signal from the output isolator 13 into N optical output signals. The cavity 50 is relatively deep, extending to level 28, to accommodate the N optical fibers coupled to the end of the splitter 16. The body member 14 also defines grooves 51, 52 that communicate with respective ends of the cavity 50. The grooves 51, 52 respectively receive the optical fiber input to the splitter 16 and the N optical fibers output from the splitter 16. The grooves 51, 52 are curved surfaces with radii greater than the minimum bending radius of the optical fibers, and are oriented to bend and guide the optical fibers into position for winding about the arcuate members 36, 37.

FIG. 6 is an end view of the body member 14. Both the front and rear end surfaces 53, 54 of the exemplary, preferred configuration of the body member 14 appear identical when viewed end-on. Accordingly, the end surface of FIG. 6 has been numbered '53, 54' to indicate that either end surface would appear as shown in FIG. 6 when viewed in this manner.

FIG. 7 is a side view of the body member 14 in which the side surface has been numbered '55, 56' to indicate either of the side surfaces 55, 56 of the body member 14 appear as shown in FIG. 7 when viewed from the side.

FIG. 8 is a bottom plan view of the body member 14. The unlined regions indicate the bottom surface 57 of the body member 14. The area indicated with alternating solid and broken lines is level 58 that is, in the exemplary embodiment of the body member 14 of FIG. 8, 1.5 inches below the level of the bottom surface 57. An approximately cylindrical wall 59 is defined in the body member 14, that extends from the bottom surface 57 to the level 58 of the body member 14. The surface of the body member 14 defining the level 58 and the wall 59 define a cavity 60 in the body member 14. The cavity 60 receives the DCF reel 15 when the apparatus 1 is assembled. The ends of the DCF 11 wound on the DCF reel 15, are inserted through the openings 30, 31 for coupling to LOFA circuit components situated on the top side of the body member 14 that is shown in FIG. 5.

The wall 59 defines ridges 61 spaced at intervals around the circumference of the wall 59. Each ridge 61 extends from the bottom surface 57 to the level 58. The ridges 61 engage with respective side edges of the DCF reel 15 when inserted into the cavity 60, and hold the DCF reel 15 securely within the body member 14.

The body member 14 can be formed by injecting a foam plastic material into a mold defining the body member 14, or by appropriately shaping a block of foam plastic material using a numerically controlled machine, for example.

FIG. 9 is a perspective view of the DCF reel 15 of the apparatus 1 that is adapted to fit into the cavity 60 of the body member 14. The DCF reel 15 includes opposing side plates 62, 63 that are separated by and fixed to respective ends of a tube 64. The tube 64 defines an aperture 65 to receive the spindle of a winding machine used to wind the DCF 11 onto the DCF reel 15. At least one of the side plates 62, 63 defines apertures 66 that receive a finger of the winding machine that drives the reel 15 to rotate to wind the DCF 11 about the tube 64. To prevent the DCF 11 from extending beyond the edges of the side plates 62, 63 where it can be damaged when inserting the reel 15 into the cavity 60, the DCF reel 15 includes a guard 67 that is cylindrical in shape and is fitted between and in contact with the side plates 62, 63. The guard 67 has a smaller diameter than the outer edges of the side plates 62, 63. The guard 67 defines two holes 68 through which are passed respective ends of the DCF 11. To allow clearance for the two end potions of the DCF 11 where they are inserted into respective openings 30, 31 of the body member 14, the side plate 62 defines indentations 69 situated in proximity to respective holes 68 in the guard 67. When the DCF reel 15 is inserted, side plate 62 first, into the cavity 60 of the body member 14 to assemble the apparatus 1, the end portions of the DCF 11 are inserted through respective openings 30, 31 and the indentations 69 are positioned over respective apertures 30, 31 so that the DCF reel 15 does not obstruct the openings 30, 31. Preferably, the plates 62, 63, the tube 65 and the guard 67 are formed of molded plastic materials that are fixed together with an adhesive.

FIG. 10 is a perspective view of the active fiber (AF) reel receptacle member 17. Preferably, the member 17 is composed of a resilient material. For example, the member 17 can be made of a foam plastic material such as polyethylene that is either molded or formed from a larger block of material that is shaped with a numerically-controlled machine. The member 17 is approximately disk-shaped and has a base 70 that supports the AF reel 18, shown in FIG. 11, when inserted into the member 17. Extending from the top side of the base 70, opposing side members 71, 72 are positioned on opposite side edges of the base 70. The side members 71, 72 are arcuate, at least on their surfaces closest to the center of the member 17, and are shaped to conform to the outer edges of the reel 18. The radii of the arcuate surfaces of side members 71, 72 are slightly less than the radius of the feel 18. Therefore, when the reel 18 is inserted between the side members 71, 72, the side members 71, 72 are forced outwardly from the center of the member 17. Due to the resilience of the material composing the member 17, the side members 71, 72 tend toward their respective normal, unflexed positions, and thus toward one another. Accordingly, the side members 71, 72 securely grip the reel 18 from opposing sides.

FIG. 11 is a perspective view of the AF reel 18 on which the active fibers 9, 12 are wound. The reel 18 includes spaced reel flanges 73, 74 between which is situated a partition 75. The active fiber 9 is wound on the reel 18 between the flange 73 and the partition 75, and the active fiber 12 is wound on the reel 18 between the partition 74 and the flange 75, or vice versa. The reel 18 defines a central aperture 76 to receive the spindle of a winding machine about which the reel 18 can be rotated to wind the active fibers 9, 12 onto the reel 18. The reel 18 also includes apertures 77 arranged at angular intervals about the reel 18 at a distance away from the central aperture 76, that can receive a finger of the winding machine to drive the reel 18 to rotate about the machine's spindle. To allow clearance for the end portions of the active fibers 9, 12, the reel 18 preferably defines aligned gaps 78, 79 in the flange 74 and the partition 75. The gaps 78, 79 provide clearance for the fibers 9, 12, and thus prevent them from being overbent, particularly when the fibers 9, 12 are fed to the reel 18 from a position above the flange 74 of the reel 18. Preferably, the reel 18 is formed from molded plastic material.

FIG. 12 is a perspective view of an optical fiber retaining ring 19. Preferably, the retaining ring 19 is made of a plastic material such as Mylar®. The inner edge of the ring 19 is preferably sized slightly smaller than the outer surfaces of the arcuate members 36, 37 so that the ring 19 is held in position when inserted over the arcuate members 36, 37. Also, the ring 19 has a radial width that fits between the outer surfaces of the arcuate members 36, 37 and the wall 42. The ring 19 is relatively thin to allow several rings 19 to be stacked into the body member 14. The ring 19 is preferably cut from a larger sheet of Mylar® material.

FIGS. 13A–13L are a sequence of views of a preferred method for assembling components of the LOFA circuit 6 and their coupling optical fibers, in the top side of the body member 14. In FIGS. 13A–13L, illustration of some components or optical fibers that are not relevant to the method step illustrated in a particular Figure may be omitted to avoid undue complication.

In FIG. 13A, the WDM 10 is fitted into the cavity 32 so that it is bounded by the walls 33, 34 of the body member 14. An optical fiber 80 coupled to a terminal of the WDM 10 is spliced with an end of the DCF 11 that is fed through the opening 31 in the body member 14. The solid bead shown in FIG. 13A denotes a splice coupling the ends of the fibers 11, 80. The coupled fibers 11, 80 are wound or looped about the arcuate members 36, 37. Preferably, the coupled fibers 11, 80 (and all other fibers used in the LOFA circuit 6) are wound for at least one-and-a-half turns about the arcuate members 36, 37 to retain the fibers 11, 80 in position on the arcuate members 36, 37.

In FIG. 13B, a retaining ting 19 is fitted over the arcuate members 36, 37 to enclose the coupled fibers 11, 80 between the surfaces 40, 41 and the retaining ring 19. Because a retaining ring 19 is preferably placed over the arcuate members 36, 37 after each optical fiber or spliced fibers are wound about the arcuate members 36, 37, subsequent Figures will show the arrangement of the fiber(s) after a ting 19 is placed over the arcuate members 36, 37 and the fiber(s) illustrated in the Figure are wound or looped around the arcuate members 36, 37.

In FIG. 13C, the AF reel 18 is fitted into the reel receptacle member 17 between side members 71, 72, and the member 17 is fitted into and held in the body member 14 between the arcuate members 36, 37. The active fiber 12 and an optical fiber 81 coupled to a terminal of the WDM 10, are spliced together as indicated by the solid bead, and the coupled fibers 11, 12 are looped about the arcuate members 36, 37 for at least one-and-a-half turns.

In FIG. 13D, a retaining ring 19 is inserted over the arcuate members 36, 37 to enclose the spliced fibers 12, 81 in the body member 14. The loose end of the active fiber 12 is spliced to the loose end of the DCF 11 with a splice represented by the solid bead in FIG. 13D, and the spliced fibers 11, 12 are looped about the arcuate members 36, 37 for at least one-and-a-half turns.

In FIG. 13E, a retaining ring 19 is fitted over the arcuate members 36, 37 to enclose the spliced fibers 11, 12 in the body member 14. The end of an optical fiber 82 coupled to the input terminal of WDM 10 is coupled by a splice indicated with the solid bead, to the active fiber 9 that is wound on the reel 18. The coupled fibers 9, 82 are looped about the arcuate members 36, 37 for at least one-and-a-half turns.

In FIG. 13F, a retaining ring 19 is fitted over the arcuate members 36, 37 to enclose the coupled fibers 9, 82 in the body member 14. The loose end of the active fiber 9 is spliced as indicated by the solid bead, to an optical fiber 83 coupled to the output terminal of the WDM 8. The spliced optical fibers 9, 83 are looped or wound about the arcuate members 36, 37 for at least one-and-a-half turns and the end of the optical fiber 83 is placed in the groove 45. The WDM 8 is placed in the cavity 46 of the body member 14.

In FIG. 13G, a retaining ring 19 is fitted over the arcuate members 36, 37 to enclose the spliced fibers 11, 83. The end of an optical fiber 84 coupled to the input terminal of the WDM 8, is spliced with the end of an optical fiber 85 coupled to the output terminal of the input isolator 7, as indicated by the solid bead in FIG. 13G. The spliced fibers 84, 85 are looped about the arcuate members 36, 37 for at least one-and-a-half turns. The end portion of the optical fiber 84 nearest the WDM 8 is placed in the groove 44, and the end portion of the fiber 85 nearest the input isolator 7 is placed in the groove 45. The input isolator 7 is placed in the cavity 46 and rests on the WDM 8.

In FIG. 13H, a retaining ting 19 is fitted over the arcuate members 36, 37 to enclose the spliced fibers 84, 85 in the body member 14. An optical fiber 86 coupled to the input terminal of the input isolator 7, is looped about the arcuate members 36, 37 for at least one-and-a-half turns. The end portion of the optical fiber 86 closest to the input isolator 7 is placed in the groove 44. The other end of the optical fiber 86 is run from the body member 14 and coupled to the input connector 3.

In FIG. 13I, a retaining ring 19 is fitted over the arcuate members 36, 37 to enclose the optical fiber 86 in the body member 14. An optical fiber 87 coupled to the output terminal of the WDM 10, is coupled by a splice indicated by the solid bead, to an optical fiber 88 coupled to the input terminal of the output isolator 13. The spliced fibers 87, 88 are wound or looped for at least one-and-a-half turns about the arcuate members 36, 37. The end portion of the optical fiber 88 closest to the output isolator 13 is placed in the groove 48 and the output isolator 13 is placed in the cavity 49.

In FIG. 13J, a retaining ring 19 is placed over the arcuate members 36, 37 to enclose the spliced optical fibers 87, 88 in the body member 14. An optical fiber 89 coupled to the output terminal of the output isolator 13, is spliced to an optical fiber 90 coupled to the input terminal of the 1×N splitter 16, the splice being indicated by the solid bead in FIG. 13J. The spliced fibers 89, 90 are looped or wound about the arcuate members 36, 37 for at least one-and-a-half turns. An end portion of the optical fiber 89 is placed in the groove 47 and an end potion of the optical fiber 90 is placed in the groove 51 and the cavity 50. The splitter 16 is also placed in the cavity 50. The N optical fibers 91 coupled to the output terminal of the splitter 16, are placed in the cavity 91 and run from the body member 14 to respective output connectors 4 where they are coupled.

Preferably, as shown in FIG. 13K, each of the optical fibers 91 are individually wound or looped about the arcuate members 36, 37 for one-and-a-half turns and held in the body member 14 with respective retaining ring 19 fitted over the arcuate members 36, 37. The fibers 91 are run from the body member 14 and their ends are coupled to respective output connectors 4. As previously mentioned, the LOFA circuit 6 can have only one output in which case the splitter 16 and its fibers 90, 91 are not used and the fiber 89 is looped about the arcuate members 36, 37 for one-and-a-half turns, held in place by a retaining ring 19 fitted over the arcuate members 36, 37, and run from the body member 14 to a single output connector 4 to which the end of the fiber 89 is coupled.

In FIG. 13K, an optical fiber 92 coupling the pump laser 25 to the second input terminal of the WDM 8, is wound about the arcuate members 36, 37 for at least one-and-a-half turns. In FIG. 13L, a retaining ring 19 is inserted over the arcuate members 36, 37 to complete the assembly of the LOFA circuit 6 and its coupled optical fibers, in the body member 14.

Optionally, the LOFA circuit 6 can have one or more taps from which a portion of the light propagating in the LOFA circuit, can be extracted. In this case, an optical fiber coupled to each tap is wound about the arcuate members 36, 37 and preferably held in the body member 14 with a respective retaining ring 19. The end of the optical fiber opposite the tap is run from the body member 14 and coupled to a respective optical-to-electrical converter (e.g., a photodiode) on the circuit board 24. The optical-to-electrical converter is electrically coupled to a respective terminal of the connector 5 via an electrical connection formed on the circuit board 24. The electrical signal generated by the optical-to-electrical converter based on the optical signal from the tap can this be supplied via connector 5 to equipment for monitoring the LOFA circuit 6.

In FIG. 14, an exploded perspective view of the protective case 2 is shown. As previously described, the protective case 2 includes a three-sided member 20, an end plate 21, a bottom plate 22 and a top plate 23. The three-sided member 20 has an end 93 and opposing sides 94, 95. The end 93 extends perpendicularly between respective front edges of opposing sides 94, 95. The end 93 defines an aperture 96 to receive the input connector 3, and an aperture 97 to receive one or, as shown in FIG. 1, a plurality of output connectors 4. Defined in the end 93 on top and bottom sides of the apertures 96, 97, the end 93 defines relatively small apertures that allow screws or the like to be inserted therethrough to attach the input and output connectors 3, 4 to the end 93.

The sides 94, 95 have respective top and bottom edges 98, 99, 100, 101 that are perpendicular to the respective major surfaces of the sides 94, 95. The top edges 98, 100 support the top plate 23 when placed thereon, and define respective apertures to receive screws 102 to fix the top plate 23 to the three-sided member 20. Although not shown in FIG. 14, as previously mentioned, the circuit board 14 is preferably mounted to the underside of the top plate 23, and a pump laser 25 is mounted to the circuit board 24. The pump laser 25 is coupled by electrical connections on the circuit board 24 to the connector 5.

The bottom plate 22 is positioned in contact with and fixed to the bottom edges 99, 101 with screws 102 fitted through apertures defined in respective bottom edges 99, 101. Through the open end of the three-sided member 20, the body member 14 with its assembled receptacle member 17, AF reel 18, retaining rings 19, LOFA circuit components and coupling optical fibers, is inserted into the open end of the three-sided member 20, front end surface 53 first. The end plate 21 is then positioned to enclose the open end of the three-sided member 20, with apertures defined in the tabs 103 that extend perpendicularly from the major surface of the end plate 21, aligned with corresponding apertures in the top and bottom edges 98, 99, 100, 101 and the aperture 104 defined in the end plate 21 aligned with the connector 5. The four rearmost screws 102 in FIG. 14 are inserted through the aligned apertures of the edges 98, 99, 100, 101 to hold the end plate 21 to the three-sided member 20 and the bottom and top plates 22, 23. The LOFA circuit 6 is thus enclosed and protected within the case 2.

Preferably, the three-sided member 20, the end plate 21, and the bottom and top plates 22, 23 are formed from a rigid, lightweight material such as hard plastic or lightweight metal. In the preferred embodiment, the member 20, the end plate 21 and the bottom and top plates 22, 23 are cut from a sheet of aluminum metal, and the three-sided member and end plate 21 can be formed by bending the sheets appropriately or by using an extrusion method. The apertures 96, 97, 104 can be cut in the aluminum metal sheets, and the remaining apertures are preferably drilled in the sheets to form the member 20 and the plates 21, 22, 23 as shown in FIG. 14.

In operation, the input connector 3 is coupled to an optical fiber cable carrying an optical input signal, and the output connector(s) 4 is coupled to a respective optical fiber cable that carries the optical output signal generated by the LOFA circuit 6 based on the optical input signal, to a desired destination(s). A plug coupled to a power supply is inserted into the connector 5 to energize the pump laser 25 to generate laser light for use in performing amplification of the optical input signal to generate the optical output signal (s). The LOFA circuit 6 thus generates at least one dispersion-compensated, amplified optical output signal that is provided to one or more remote destinations via respective output connectors 4. The apparatus 1 can be mounted in a rack or an enclosure with brackets or the like for storage of the apparatus during operation.

For example, the apparatus 1 can be used to amplify and perform dispersion-compensation on an optical input signal that carded video information for cable television. In this application, the optical input signal input to the LOFA circuit can be a head-end source for cable television, and the optical output signals can be distributed to other LOFA circuits serving respective neighborhoods, for example, for transmission to homes. Thus, the apparatus 1 can be used to house a LOFA circuit situated at any desired point between the head-end video source and a home that receives the video information.

The apparatus 1 described above provides several advantages over conventional LOFA packaging assemblies. For example, the components of the LOFA circuit 6 can all be retained within the body member 14 and thus are protected from damage that might otherwise occur when assembling or servicing the LOFA circuit 6. The body member 14 also provides a degree of shock or impact protection for the LOFA circuit. Also, the retaining rings 19 hold the optical fibers coupling the LOFA circuit components inside of the body member 14 to minimize the exposure of the optical fibers to damage. Furthermore, due to the configuration of the apparatus 1, the LOFA circuit components and their coupling optical fibers are well-organized in the assembled body member 14, the receptacle member 17, the AF reel 18 and the retaining rings 19 so that the components and fibers can be readily assembled and later accessed, if necessary, by a service person. In addition, the case 2, formed from rigid material, provides significant shock or impact protection for the LOFA circuit 6 and its associated components when inserted therein. Moreover, in its assembled state, the apparatus 1 is a unitary structure that is relatively lightweight to allow easy handling of the apparatus.

Although the invention has been described with specific illustrations and embodiments, it will be clear to those of ordinary skill in the art that various modifications may be made therein without departing from the spirit and scope of the invention as outlined in the following claims.

We claim:

1. An apparatus for housing a linearized optical fiber amplifier (LOFA) having a plurality of individual components, said apparatus comprising:

a body member having first and second sides; and a first cavity in said first side and a plurality of cavities in said second side, said plurality of cavities defining different levels within said second side of said body member at least one of said cavities being configured to receive one or more of the components of the LOFA circuit.

2. An apparatus as claimed in claim 1 wherein said second cavity is configured to receive a wave division multiplexer (WDM).

3. An apparatus as claimed in claim 2, wherein said body member has first and second arcuate members arranged on opposite sides of said second cavity, said arcuate members being adapted to leave wound thereabout at least one optical fiber coupling component of the LOFA circuit and to store at least one splice joining the optical fiber coupling components of the LOFA circuit.

4. An apparatus as claimed in claim 3, wherein said body member has first and second surfaces positioned on opposing sides of said one cavity that receives the WDM, said first and second surfaces being adapted to provide support for the optical fiber and said retaining ring.

5. An apparatus as claimed in claim 4, wherein a protective case having a cover member is adapted to receive said body member, the apparatus further comprising:

a circuit board mounted to said cover member, having a connector and electronic circuitry coupled thereto, said connector being aligned with an aperture defined in the case when said case is assembled; and a pump laser mounted to the circuit board and coupled to said electronic circuitry, wherein the pump laser is adapted to receive electric power from the electronic circuitry through the connector when a plug coupled to a power supply is inserted through the aperture in the case and coupled to the connector, said pump laser upon application of power generating laser light and being coupled to supply the laser light to the LOFA circuit, said cover functioning as a heat sink for said pump laser.

6. An apparatus as claimed in claim 5, further comprising:

an input optical connector mounted to the case, the input connector being coupled to the LOFA circuit and capable of receiving a connecting member terminating an optical fiber cable that carries an input optical signal to the LOFA circuit.

7. An apparatus as claimed in claim 6, further comprising:

at least one output connector mounted to the case, the output connector being adapted to be coupled to the LOFA circuit to receive an optical output signal generated by the LOFA circuit based on the optical input signal and the laser light generated by said pump laser, the output connector being adapted to receive a connector coupled to a second optical fiber cable for transmitting the optical output signal generated by the LOFA circuit from the apparatus.

8. An apparatus as claimed in claim 4, further comprising:

a reel receptacle member having first and second opposing side members, said receptacle member being capable of being inserted between said first and second arcuate members to be held therebetween; and an active fiber reel for storing at least one active fiber of the LOFA circuit, fitted between said first and second side members of said reel receptacle member.

9. An apparatus as claimed in claim 3, wherein each of said first and second arcuate members has a radius of curvature that is greater than or equal to the minimum bending radius of the optical fiber.

10. An apparatus as claimed in claim 3, further comprising:

at least one retaining ting adapted to be fitted over said first and second arcuate members to confine at least one optical fiber coupling component of the LOFA circuit.

11. An apparatus as claimed in claim 2, wherein said body member has at least one opening therein communicating with said first cavity in said first side of said body member and said second cavity in said second side of the body member, said opening allowing passage of at least one optical fiber coupled between the DCF reel housed in said first cavity of said body member and said additional WDM of the LOFA circuit housed in said second said cavity of said body member.

12. An apparatus as claimed in claim 1, wherein said body member is composed of foam plastic material.

13. An apparatus as claimed in claim 1, further comprising:

a protective case into which said body member is fitted.

14. An apparatus as claimed in claim 1 wherein said first cavity is configured to receive a dispersion compensation fiber (DCF) reel of the LOFA circuit.

15. An apparatus as claimed in claim 1, wherein said second side of said body member has at least one groove therein communicating with at least said second cavity said groove being adapted to receive an optical fiber of a LOFA circuit component housed in the cavity.

* * * * *